United States Patent [19]

Blair et al.

[11] Patent Number: 5,238,327
[45] Date of Patent: Aug. 24, 1993

[54] DUAL-CHAMBER INFLATABLE OIL BOOM

[76] Inventors: Russell M. Blair, 58 Woodside Ave., Westport, Conn. 06880; Edward T. Tedeschi, 33 Grand St., Seymour, Conn. 06483

[21] Appl. No.: 865,954

[22] Filed: Apr. 9, 1992

[51] Int. Cl.⁵ .................................. E02B 15/06
[52] U.S. Cl. ............................ 405/68; 405/70; 405/72
[58] Field of Search ............... 405/63, 64, 66, 67, 405/68, 69, 70, 72; 210/923

[56] References Cited

U.S. PATENT DOCUMENTS

| | | |
|---|---|---|
| 3,563,036 | 2/1971 | Smith et al. |
| 3,798,911 | 3/1974 | Oberg |
| 3,848,417 | 11/1974 | Smith et al. |
| 3,849,989 | 11/1974 | Preus |
| 3,859,796 | 1/1975 | Benson ............... 405/68 X |
| 4,015,431 | 4/1977 | Ahiko ................. 405/68 |
| 4,062,191 | 12/1977 | Preus ................. 405/72 |
| 4,269,538 | 5/1981 | Hauan |
| 4,295,756 | 10/1981 | Blair .................. 405/70 |
| 4,320,991 | 3/1982 | Rogers |
| 4,537,528 | 8/1985 | Simpson ............. 405/72 |
| 4,652,173 | 3/1987 | Kallestad |
| 4,993,871 | 2/1991 | Lundin |
| 5,022,785 | 6/1991 | Goans |

FOREIGN PATENT DOCUMENTS

| | | | |
|---|---|---|---|
| 1294889 | 5/1969 | Fed. Rep. of Germany | 405/68 |
| 1550622 | 8/1979 | United Kingdom | 405/68 |

*Primary Examiner*—David H. Corbin

[57] ABSTRACT

Floating oil are containment boom sections are provided with one or a plurality of collapsible and inflatable bladders or buoyancy chambers, extending along the upper edge of the boom section's skirt, and enclosed inside an elongated gas-impervious sleeve which is also collapsible and independently inflatable through its own inflation/deflation valve, producing dual chamber inflated buoyant flotation forming the upper edge of the boom. ASTM scarf-joint connectors join adjacent boom sections, which are ballasted along their lower skirt edges and provided with tension-carrying reinforcing cable, chain or webbing.

14 Claims, 2 Drawing Sheets

FIG. 7
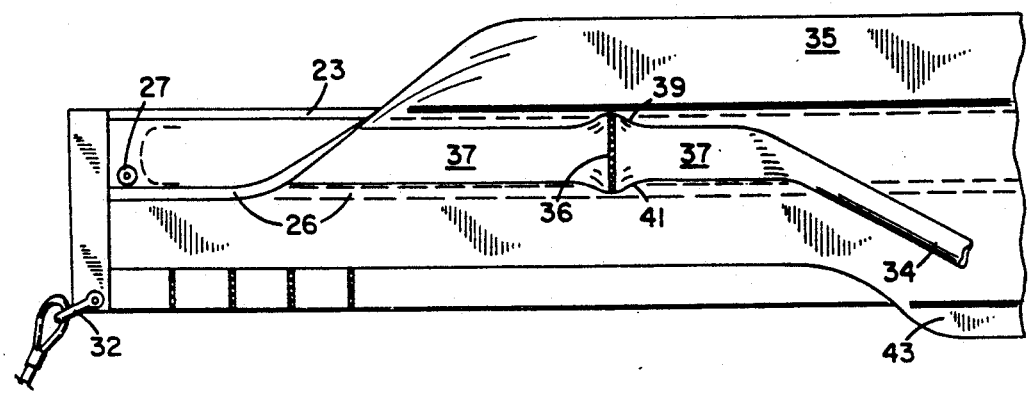
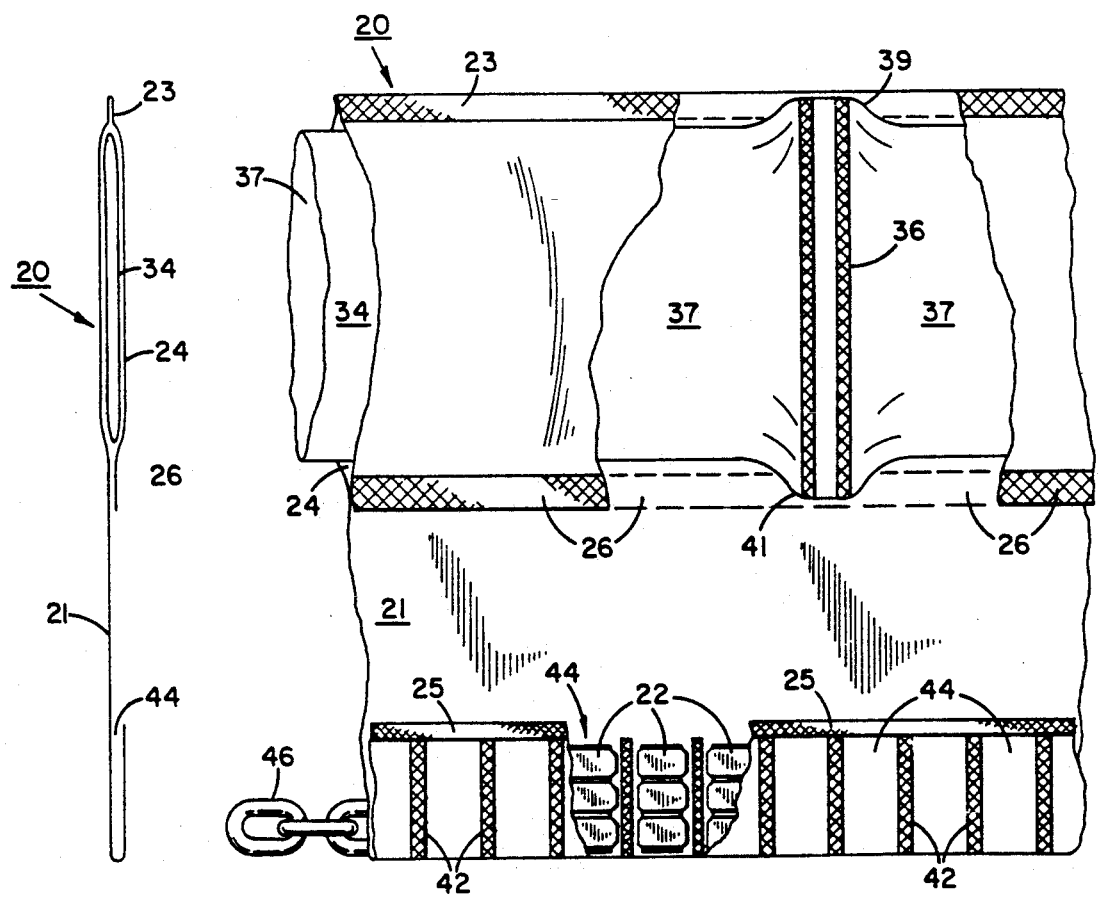
FIG. 4
FIG. 8

DUAL-CHAMBER INFLATABLE OIL BOOM

FIELD OF THE INVENTION

This invention relates to floating oil containment booms for surrounding and preventing the escape of floating oil and other floating materials and debris on a water surface, and particularly to floating oil booms which may be compactly flaked accordion fashion or wound on reels for storage and may be deployed by inflating flotation chambers along the upper edge of the boom during deployment to provide the desired buoyancy, and thus supporting a depending ballasted skirt blocking the passage of floating oil.

BACKGROUND OF THE INVENTION

Floating booms with inflatable buoyancy chambers of various kinds have been proposed over many years. For example, the booms shown in U.S. Pat. Nos. 3,563,036 and 5,022,785 are inflated by separate compressed gas cylinders inflating each of a series of hollow flotation chambers, or by chemical reactants enclosed in separate flexible sealed containers inside the inflatable chambers and separated by a rupturable partition, which may be caused to burst by passing the boom structure endwise through pinch rolls, mixing the reactants and generating gas pressures sufficient to inflate the flotation chambers. U.S. Pat. No. 3,849,989 shows another oil containment boom incorporating inflatable chambers arrayed along its upper edge with separate inflation valves permitting compressed gas inflation of each of the inflation chambers in turn.

SUMMARY OF THE INVENTION

In the inflatable oil containment booms of the present invention, an array of a plurality of inflatable chambers or bladders are enclosed within a separate elongated sleeve type enclosure extending along the upper edge of the oil containment boom structure. This enclosing sleeve is independently and separately inflatable and deflatable through its own inflation check valve at intervals along the boom, and each of the inflatable bladder chambers is also separately and independently inflatable and deflatable through inflation check valves extending from the interior of the inflatable chambers through the outer sleeve to the outside atmosphere, where they can be supplied with compressed gas or air through or from a fixed or portable blower.

As a result, the inflatable flotation chambers are enclosed within a separate inflated sleeve, providing redundant buoyant inflation along the entire upper edge of the boom structure. If the outer inflated sleeve should be abraded, damaged or punctured, so that it loses its inflation pressure, the inflated chambers inside are individually capable of supporting the entire adjacent segments of the boom, and providing the buoyancy needed to maintain the floating boom deployed in its oil containment position on the water surface.

For convenient access to the interior of the sleeve for replacement of individual inflatable bladder chambers, the outer flotation sleeve wall may be provided with an elongated sealable seam like the ZIP-LOKA TM seam on sealable plastic food bags, extending intermittently or continuously along the length of the boom structure, and this seam may be conveniently sealed to close the outer flotation chamber in airtight and inflatable condition, and accordingly may be peeled open to unseal and separate the two sidewalls forming the outer sleeve, exposing each of the successive internal inflatable bladder chambers in turn for replacement as desired, without affecting the depending skirt and the ballast arrayed along the lower edge of the skirt, or any reinforcing tension members, cables or webs employed to transmit tension forces from one end of the boom to the other. For convenience, the boom structures of the present invention may be fabricated in 100 foot sections for example, terminating at each end with connectors such as those shown in U.S. Pat. No. 4,295,756, for engagement with the next succeeding boom section and with the sealable inflatable sleeve extending from one connector at one end of the boom along its entire section length to the connector at the other end of the boom, with 10 inflatable bladders of approximately 10 feet in length being positioned end to end inside the resulting outer flotation chamber.

Accordingly, a principal object of the present invention is to provide floating pollution containment boom structures which may be flaked and folded flat or wound on reels for storage and may be deployed by successively inflating a plurality of inflatable chambers arrayed along the upper flotation edge of the boom structure, and by also inflating an enclosing outer flotation sleeve embracing the individual inner flotation chambers and providing a redundant inflatable buoyancy for the boom.

Another object of the invention is to provide such oil containment booms affording access to the interior of the outer inflatable sleeve through a resealable seam, which may be opened to expose the individual inner inflatable chambers for repair or replacement as desired and may then be resealed to assure inflatable integrity of the outer flotation sleeve itself.

Still another object of the invention is to provide such redundantly inflatable buoyant floating oil containment booms in which individual inner flotation chambers may be filled through individual check valves, and the enclosing outer inflatable sleeve may be inflated through its own independent inflation check valve.

Other objects of the invention will in part be obvious and will in part appear hereinafter.

The invention accordingly comprises the features of construction, combinations of elements, and arrangements of parts which will be exemplified in the construction hereinafter set forth, and the scope of the invention will be indicated in the claims.

THE DRAWINGS

For a fuller understanding of the nature and objects of the invention, reference should be made to the following detailed description taken in connection with the accompanying drawings, in which:

FIG. 2 is a corresponding fragmentary schematic perspective view of a second embodiment of the present invention;

FIG. 4 is an end elevation view of a deflated oil containment boom of the present invention showing how flat its deflated condition may be;

FIG. 7 is a fragmentary front elevational view showing the boom of FIG. 3 during the process of its assembly and manufacture; and FIG. 8 is an enlarged fragmentary view of the same boom, partially broken away to illustrate its preferred structural details.

BEST MODE FOR CARRYING OUT THE INVENTION

Figure 1:
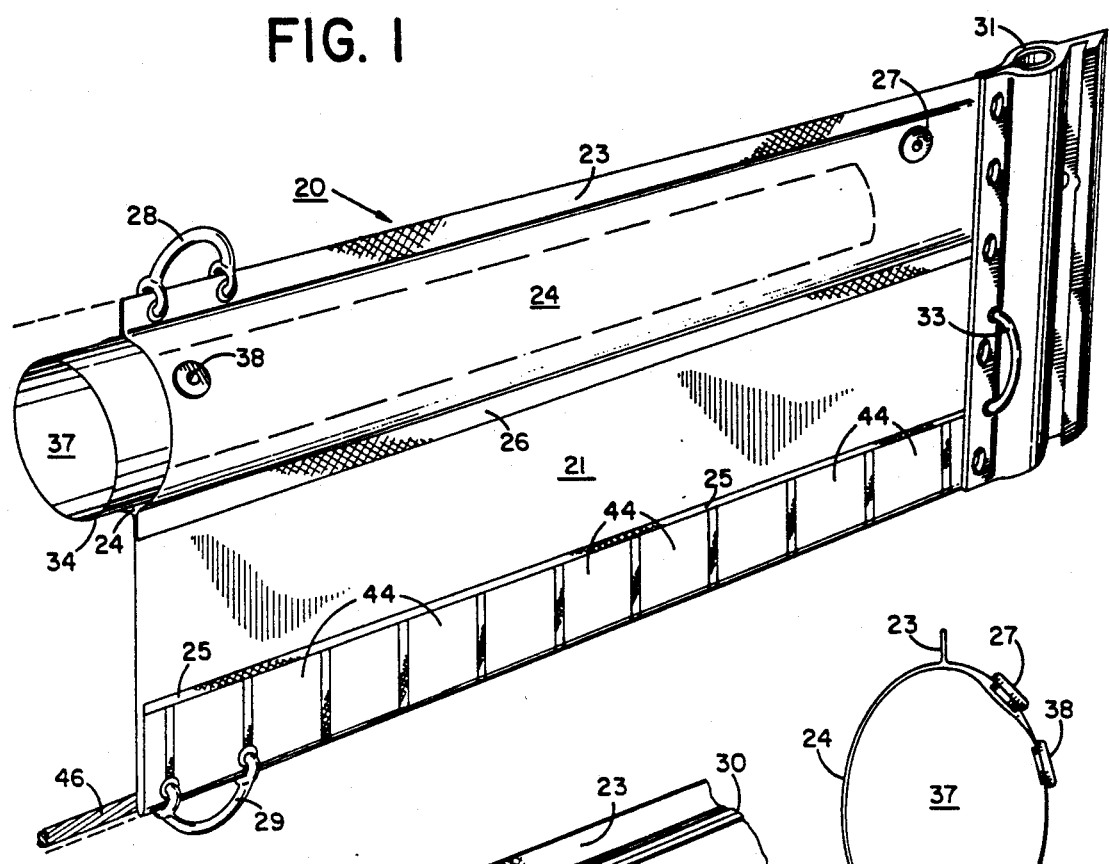
FIG. 1 is a schematic perspective view partially in cross section showing a segment of the oil containment boom of the present invention.
Figure 3:
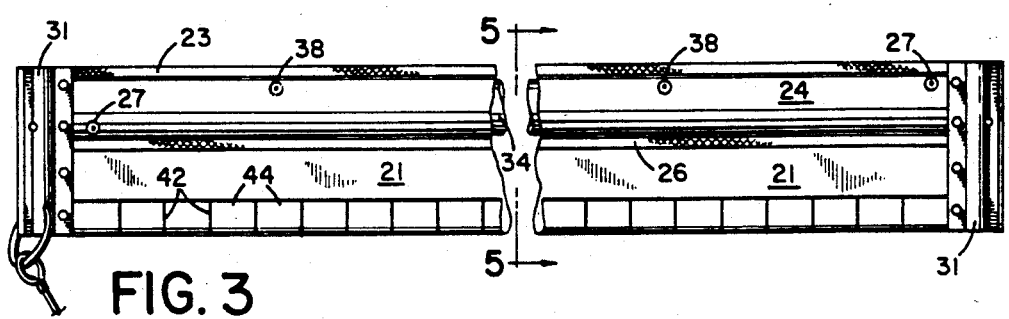
FIG. 3 is a front elevational view showing an oil containment boom of the present invention with its central portion broken away.

The oil containment booms of the present invention are flexible, deformable elongated structures, preferably formed of aramid fiber fabric or similar polymeric fabrics, permitting them to be folded accordion fashion or reeled for storage, and conveniently fabricated with adhesives or heat seals to bond successive layers of fabric together in an air-tight manner. As indicated in FIG. 4, the deflated oil boom structure 20 ready for accordion folding or reeling is essentially flat, with the depending lower skirt portion 21 extending throughout its length and forming the lower edge of the elongated booms, as indicated in FIGS. 1 and 3.

Mounted along the lower edge of skirt 21 is weighted ballast 22, which may take the form of a series of flat lead strips dimensioned to fit into suitable pockets 44 along the lower edge of skirt 21. These strips may be scored in segments so they may be easily broken apart along score lines to provide the weight desired. Such scored ballast strips are sometimes called "Hershey Bar" weights for this reason. After insertion, the ballast weights are permanently enclosed by a top seam 25, sealed by heat or adhesive to close each pocket 44.

The upper half 35 of the fabric structure of boom 20 is doubled back upon itself or formed from separate lengths of fabric to form a hollow enclosure, the upper edge of which is heat sealed to form a top fin 23 or splash guard approximately one or two inches in height protruding upward above the remaining structure of boom 20. This fin 23 deflects a wave lapping over the flotation portion of the device and prevents the escape of contained oil in moderately rough seas.

Figure 6:
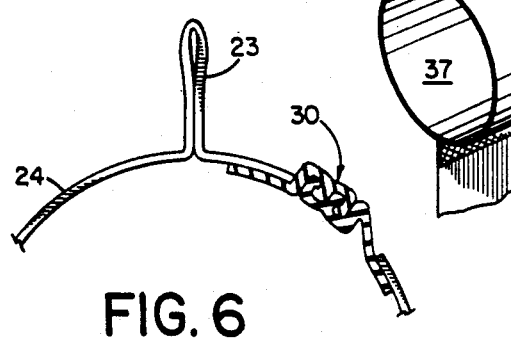
FIG. 6 is a greatly enlarged schematic end elevation view of the embodiment illustrated in FIG. 4.
Figure 5:
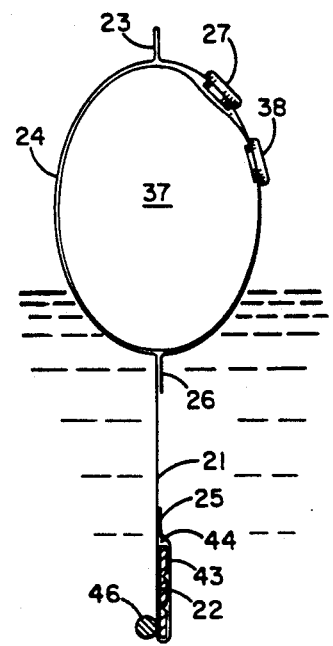
FIG. 5 is a corresponding inflated view of a section of an oil containment boom of the present invention ready for deployment on the water surface.

The back folded double portion 35 of the skirt fabric extends approximately halfway down the height of the structure from top fin 23 toward the ballasted lower edge 22 of the skirt 21. The lower edge of this back-folded or separate length of fabric strip 35 is heat sealed along a seam 26 to the underlying fabric strip to form an outer flotation chamber or gas-impervious buoyancy sleeve shaped as a tubular sleeve and extending along the the upper edge of the entire longitudinal length of the section, as indicated in the drawings. A lengthwise openable and resealable ZipLoc TM type seam 30 (FIGS. 2,6) may be installed, if desired, on sleeve 24. This outer flotation chamber 24 is provided with an inflation/deflation valve 27 at one or both ends of outer flotation chamber 24. These valves 27 may perform an additional function as pressure relief valves in the case of overpressuring caused by overheating in direct tropical sunlight or when the boom is to be refolded or reeled for storage and the inflation chamber 24 is ready for deflation. If desired, this deflation can be performed by vacuum or by passing the structure endwise through pinch rolls provided the inflation filler valves 27 are formed as pressure relief valves, when overpressure conditions occur.

As indicated in the figures, handles 28 and 29 are mounted respectively along the top fin and at the lower edge of the skirt by which the oil containment boom segments may be maneuvered during inflation, deployment, deflation, reeling or folding and storage.

At each end of the boom section, there is mounted an American Society for Testing Materials standard F-962 connector 31, forming an oil-tight seal and a sturdy connection between each boom section and the next adjoining boom section. These connectors, sold by Slickbar Products Corporation under the trademark "SLICK HITCH" are disclosed and fully described in U.S. Pat. No. 4,295,756. The anchor rode connection formed as a shackle 32 or a cable loop 33 connected to the lower end of each Slick Hitch connector 31 allows intermediate anchors to be secured by anchor rodes to the boom at each Slick Hitch junction between boom sections, thus affording accurate positioning of the floating boom against winds and currents and securing it in the desired location.

Inside the outer flotation chamber 24, an internal gas-impervious flotation tube 34 is positioned, preferably incorporating intermediate partitions or bulkheads 36 segregating the interior of the internal flotation tube 34 into an arrayed series of aligned bladder flotation chambers 37. Each of these chambers 37 has its own gas inflation/deflation valve 38 to admit compressed gas or compressed or blow air extending through the outer flotation chamber 24 as well as the wall of the internal flotation tube 37.

The outer flotation chamber 24 enclosing the internal flotation tube 34 and the heat sealed partitioning 36 of the internal tube 34 into the separate arrayed plurality of bladders 37 is shown in FIGS. 7 and 8. In these figures, it will be noted that the heat sealed partitions 36 forming the bulkhead between successive adjacent flotation bladders or chambers 37 flatten the internal flotation tube 34 and bring its upper and lower edges 39 and 41 into overlapping relationship between the layers of the outer flotation chamber 24, heat sealed to form top fin 23, and heat seal 26 along the lower edge of the outer flotation chamber 24. By this means, the internal flotation tube 34 forming the succession of flotation chambers 37 inside the outer flotation chamber 24 is positioned both vertically and horizontally relative to the flotation chamber 24, with the upper and lower edges of tube 34 being positioned permanently at spaced intervals or continuously along the heat sealed upper and lower edges of the flotation chamber 24, and with the partition bulkheads 36 being arrayed longitudinally at the appropriate locations along the length of the overall structure 20. If bulkhead partitions 36 are omitted, a single flotation chamber 37 inside tube 34 results, and overlaps 39 and 41 may be positioned at both ends of internal flotation tube 34, or at intermediate points, or continuously along the top or bottom of tube 34 as desired.

The overlaps at the upper and lower ends of the heat sealed partition bulkheads 36, transversely crossing internal flotation tube 34 from top to bottom, where these ends of the heat sealed partition are interposed between the two fabric layers forming the top fin 23 and the lower heat sealed seam 26 closing the lower edge of the outer flotation chamber 24, thus assure that the internal flotation tube 34 will be positioned at the desired height at these partition overlap points inside outer flotation chamber 24 and that the internal flotation tube 34 will be arrayed in substantially elongated and "stretched" condition without undue wrinkling, so that the entire boom structure will be capable of inflation to useful buoyant condition with its maximum available length being deployed for each boom section inflated to that condition.

The upturned lower edge of skirt 21 is shown in FIGS. 1, 4, 5, 7 and 8. This upturned panel 43 is secured to the adjacent face of skirt 21 by a spaced plurality of vertical heat seals 42. These vertical heat seals 42 thus convert the upturned lower panel 43 into a series of pockets 44 opening upward, in which the ballast weights 22 may be fitted in each pocket as desired, and secured in place by a heat sealed seam 25 sealing the top of each ballast pocket 44. Alternatively, ballast weights riveted through the lower edge of the skirt 21 may be employed as illustrated in U.S. Pat. Nos. 3,848,417 and 4,295,756.

The fabrication technique for producing the oil containment boom 20 of the present invention is illustrated schematically in FIG. 7. In this figure, it will noted that at the right hand edge, the fabric is unfolded flat and its overall width is 160% or more of the height of the completed boom. Lower edge panel 43 of skirt 21 is illustrated at the right hand side of FIG. 7 and in the greater portion of FIG. 7 this lower edge panel 43 is folded up and heat sealed into position to create pockets 44 just previously described.

Across the upper portion of FIG. 7 the internal flotation tube 34 separated by vertical partition heat sealed bulkheads 36 into separate inflatable chambers 37 is shown in the process of being inserted into the outer flotation chamber 24 formed along the upper edge of the structure by the downfolding of the uppermost flap forming the upper edge of the fabric material to bring its outermost edge into juxtaposition with skirt 21 along the upper central portion of the elongated oil containment boom structure, where this edge of the fabric is heat sealed along the seam 26 to close the outer flotation chamber 24 into a tubular sleeve encircling and containing the internal flotation tube 34, all as indicated in FIG. 8.

It will be evident from comparison of FIGS. 1, 3, 5 and 7 that the inflation valves 38 introducing gas or air under pressure from the outside of the structure through the outer envelope of internal flotation tube 34 into the interior of each inflatable chamber 37 must be installed during the downfolding process illustrated in FIG. 7, so that the juxtaposition of the two layers of fabric through which these filler valves 38 are installed will be maintained in proper alignment during the downfolding and heat sealing of the outer flotation chamber 24 to assure the smooth, flat, unwrinkled condition of the deflated structure during folding or reeling and storage.

Tension member 46 may be a stainless steel cable, a chain, a synthetic rope or a heavy woven webbing member secured at intervals along skirt 21, with its ends secured to end connectors 31 at each end of the boom section. Endwise tension loads caused by towing the boom, transverse currents, wave impact or wind loading are thus transmitted by tension members 46 via end connectors 31 along the entire length of the assembled and deployed boom, avoiding undue tensile stress on skirt 21, outer flotation chamber 24 or inner flotation tube 34.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

We claim:

1. An elongated floating material containment boom section having a normally vertical ballasted skirt depending from flotation means, and convertible from a flattened collapsed condition to a deployable condition wherein buoyancy chamber means extending along the upper edge of said skirt are inflated to expanded buoyant configuration, including:
   a gas-impervious sleeve (24) extending along the upper edge of said normally vertical skirt (21) forming a first outer collapsible and inflatable flotation chamber (24),
   a first inflation valve (27) connecting the interior of said sleeve with the ambient atmosphere, through which gas under pressure may be introduced into said sleeve to inflate said first buoyant outer flotation chamber,
   elongated gas-impervious tube means (34) positioned inside said outer flotation chamber (24) and forming second collapsible and inflatable internal flotation bladder chamber means (37),
   second inflation valve means (38) connecting the interior of said bladder means (37) through said outer flotation chamber (24) to the ambient atmosphere through which gas under pressure may be introduced into said bladder means (37) to inflate it forming said second flotation chamber means (37) inside said outer flotation chamber (24).

2. The boom section defined in claim 1, further including a latching scarf joint connector (31) mounted on each section end, whereby the boom section is adapted for operative latched end-to-end connection to an adjacent boom section.

3. The boom section defined in claim 2, further including an elongated tension-carrying reinforcing member (46) attached to the lower edge of said skirt (21) with each end of said reinforcing member being anchored to one said connector (31) at one end of said boom section, whereby tension loads imposed by wind, current, wave action or towing forces are transmitted along each said boom section without imposing damaging tension loads on said skirt or said flotation chambers (24) or (37).

4. The boom section defined in claim 1 wherein said bladder means (37) when inflated substantially fill the internal volume of said outer inflation chamber (24).

5. The boom section defined in claim 1 wherein said inner flotation tube means (37) is subdivided by substantially vertical sealed bulkhead partitions (36) into a longitudinally arrayed plurality of independent inflatable bladder chambers (37) inside said outer inflation chamber (24).

6. The boom section defined in claim 5 wherein said bulkhead partitions (36) are secured at spaced intervals to the interior of said outer inflation chamber (24), matching the positioning of said inflatable chambers (37) along said outer inflation chamber (24) to assure smooth flat configuration of the boom section in its collapsed condition.

7. The boom section defined in claim 2, further including anchor rode attachment means secured to the lower end of each connector (31), whereby each boom section can be held in deployed position by separate anchors each respectively attached to one said connector (31).

8. The boom section defined in claim 1, wherein the ballasted skirt is provided with separate ballast weights (22), each secured in an individual sealed pocket (44) positioned near the lower edge of said skirt (21).

9. The boom section defined in claim 1 wherein the outer flotation chamber (24) is provided with an elongated openable and resealable seam extending intermittently along its length, whereby the inflatable outer flotation chamber (24) can be opened partially along its length to facilitate repair or replacement of the inner inflatable flotation tube (34) forming bladder means (37).

10. The boom section defined in claim 5, wherein each independent inflatable bladder chamber (37) is provided with its own second inflation valve means (38).

11. The boom section defined in claim 1 further including handholds (28, 29) protruding at spaced intervals from said boom section, whereby its storage and its deployment can be facilitated.

12. The boom section defined in claim 11, wherein at least some of said handholds (28) protrude upward above said outer flotation chamber (24), and the remainder of said handholds (29) protrude downward below the lower edge of said skirt (21).

13. The boom section defined in claim 5 wherein said bulkhead partitions (36) are secured to the interior of said outer inflation chamber (24), matching the positioning of said inflatable chambers (37) along said outer inflation chamber (24) to assure smooth flat configuration of the boom section in its collapsed condition.

14. The boom section defined in claim 1 wherein the outer flotation chamber (24) is provided with an elongated openable and resealable seam extending continuously along its length, whereby the inflatable outer flotation chamber (24) can be opened continuously along its length to facilitate repair or replacement of the inner inflatable flotation tube (34) forming bladder means (37).

* * * * *

UNITED STATES PATENT AND TRADEMARK OFFICE
CERTIFICATE OF CORRECTION

PATENT NO. : 5,238,327
DATED : August 24, 1993
INVENTOR(S) : Russell M. Blair
　　　　　　　Edward T. Tedeschi It is certified that error appears in the above-indentified patent and that said Letters Patent is hereby corrected as shown below:

In column 1, line 62:

"ZIP-LOKA TM" should be --ZipLoc$^{TM}$--

Signed and Sealed this

Twenty-sixth Day of September, 1995

Attest:

BRUCE LEHMAN

*Attesting Officer*　　　　*Commissioner of Patents and Trademarks*